Aug. 30, 1955 — J. T. LANDGRAF — 2,716,423
TROUGH VALVE
Filed Aug. 10, 1950
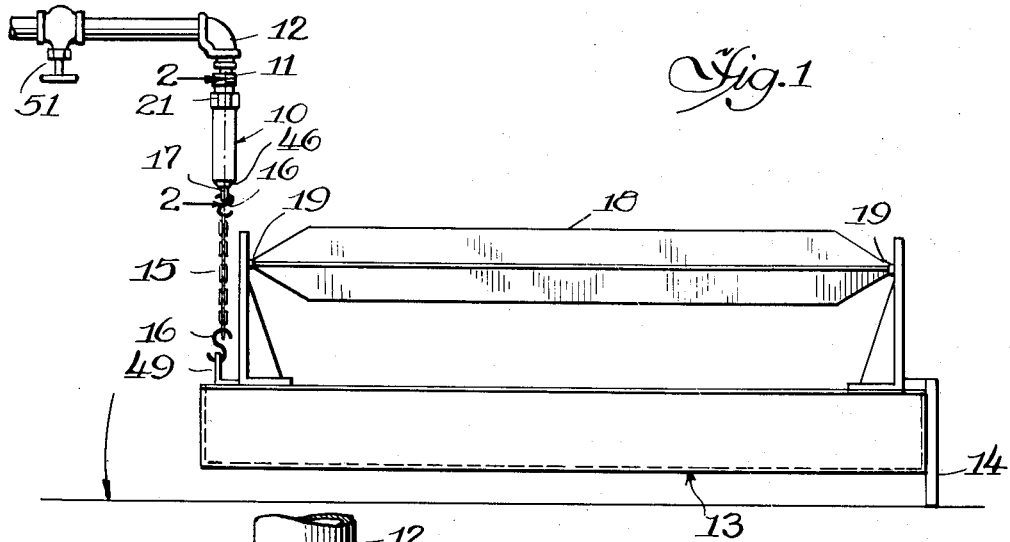
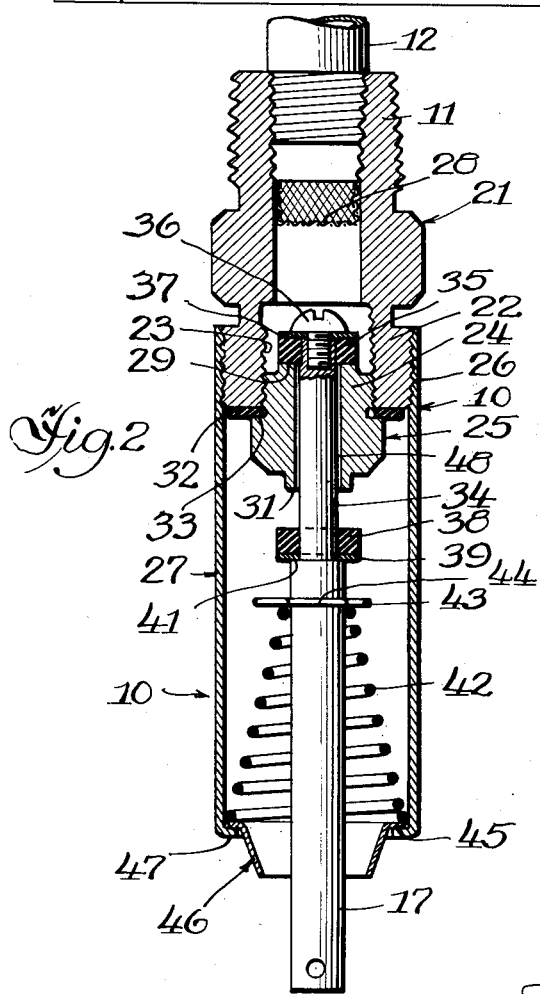
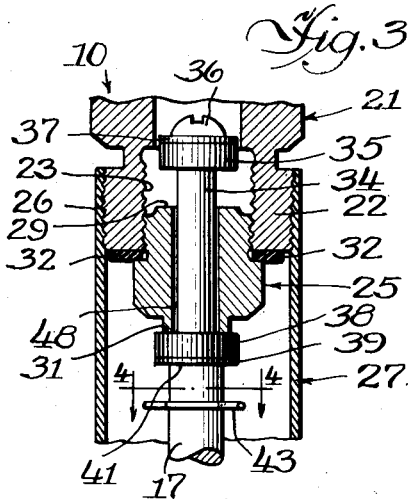
Inventor,
Jacob T. Landgraf
By: Wilson & Geppert, Attys.

United States Patent Office 2,716,423
Patented Aug. 30, 1955

2,716,423

TROUGH VALVE

Jacob T. Landgraf, Freeport, Ill., assignor to H. D. Hudson Manufacturing Company, Chicago, Ill., a corporation of Minnesota Application August 10, 1950, Serial No. 178,617

3 Claims. (Cl. 137—408)

The present invention relates to a valve construction and assembly and especially to a novel double-acting trough valve for automatically controlling the flow of water to a trough waterer or fountain for poultry and other animals.

Among the objects of the present invention is the provision of a novel double-acting valve assembly for a trough waterer or fountain in which the valve automatically controls the passage of water by automatically shutting off the flow when the trough is filled to a predetermined depth or quantity and automatically reestablishing the flow when the quantity of water has decreased below a predetermined depth, and thereby to automatically maintain any desired and predetermined water level or quantity in the trough.

A further novel feature of the present invention is the provision of a valve assembly for a trough waterer or fountain so constructed and arranged as to be readily adjustable for use with any trough of average length, depth and weight and which successfully operates through a wide range of water pressures.

Another important object of the present invention is to provide a novel double-acting valve attachment for a trough waterer or fountain in which the valve stem is spring-biased to elevated position whereby when the trough is removed or becomes detached or disconnected, the valve automatically shuts off the water supply and remains closed until the trough is again connected to the valve, and in the event the water supply through the valve is temporarily disconnected, as when the water is shut off in the main line, it is unnecessary to reset the valve for it automatically reopens to permit passage of water to the trough when the water supply is reestablished.

The present invention further comprehends the provision of a novel double-acting valve assembly for controlling the flow of drinking water to a trough waterer or fountain for chickens and other animals in which the valve is provided with spaced, opposed sealing elements or gaskets and valve seats so constructed, arranged and related as to effectively control the flow of water under all conditions encountered in use.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modifications and change, and comprehends other details, arrangement of parts, features and constructions without departing from the spirit of the invention.

In the drawing:

Figure 1 is a view in front elevation of a trough waterer or fountain equipped with the present novel assembly for controlling the flow of water to the trough.

Fig. 2 is a greatly enlarged view in vertical cross section through the valve assembly, the view being taken in a plane represented by the line 2—2 of Fig. 1, and the valve stem shown in its fully lowered position in which the valve is closed to stop the flow or passage of water to the filled trough.

Fig. 3 is a fragmentary cross-sectional view of the valve of Fig. 2 but showing the valve stem elevated by its coil or compression spring to the closed position the valve occupies when the suspended weight of the trough has been removed, whereby to automatically shut off the flow of water through the valve until the trough is again attached to and suspended from the valve assembly.

Fig. 4 is a view in horizontal cross section taken in a plane represented by the line 4—4 of Fig. 3.

Referring more particularly to the disclosure in the drawing and to the novel embodiment therein selected to illustrate the present invention, the novel trough valve assembly is generally designated by the reference numeral 10 and is provided with an internally and externally threaded connection 11 at its upper end for attachment to a supply pipe 12 for supplying water through the valve assembly to a trough waterer or fountain 13 for poultry or other animals. By providing the connection 11 with external threads, the valve may be connected to a supply pipe of greater diameter than the pipe shown. This trough waterer or fountain is supported at one end upon an adjustable supporting bracket or stand 14 and at its other end is connected by a chain 15 and hooks 16 so as to be suspended from the lower end of a valve stem 17 in the valve assembly. In the illustrative embodiment the trough or fountain is provided with a bladed reel 18 which floats on shouldered reel pins 19 at its opposite ends.

The valve assembly 10 is provided at its upper end with a valve head 21 having the threaded connection 11 at its upper end and a depending part 22 threaded on its interior at 23 for receiving the upper threaded end 24 of a valve seat member 25, and threaded on its exterior for receiving the interiorly threaded upper end 26 of an encompassing sleeve 27. Within the central or longitudinal bore of the valve head 21 is mounted a strainer 28 for filtering out foreign particles from the entering water supply.

The valve seat member 25 is provided with a valve seat or seating surface 29 at its upper or outer end and a valve seat or seating surface 31 at its lower or inner end with these seating surfaces disposed in spaced, opposed relation. To seal against leakage between the depending threaded part 22 and the upper threaded end 24 of the valve seat member 25, a resilient sealing washer or gasket 32 between the lower end of the part 22 and a peripheral shoulder 33 formed on the valve seat member 25 is provided.

The valve seat member 25 is provided with a central bore for receiving the upper reduced end 34 of the valve stem 17. Affixed to the extreme upper end of the stem is mounted a resilient sealing element or gasket 35 held in fixed and assembled relation by a screw 36 and a washer 37. At a point spaced from and beneath or inwardly of the valve seat member 25, there is provided on the reduced upper end of the valve stem 17 a second resilient sealing element or gasket 38 seating upon a washer 39 secured to the valve stem and abutting a shoulder or offset 41 on the stem. Thus the valve stem is provided with spaced and opposed sealing elements or gaskets 35 and 38 adapted to have sealing contact with the valve seats or seating surfaces 29 and 31, respectively, the gasket 35 sealing against passage of water through the valve when the stem is in its fully lowered or depressed position (see Fig. 2) as when the trough is filled with water to its predetermined depth, and the gasket 38 sealing against passage of water through the valve when the stem is elevated to its raised position (see Fig. 3) as when the trough has been disconnected from the valve.

In the event the trough is disconnected or detached, the valve stem 17 is spring-biased to elevated position by a coil or compression spring 42 bearing at its upper end against a hair pin cotter 43 (see Fig. 4) anchored in an annular groove or channel 44 in the valve stem, and bearing at its lower end against the flanged end 45 of a conical collar or sleeve 46 held against an inturned flange 47 in the base or lower end of the encompassing sleeve 27. This conical collar or sleeve 46 provides a discharge port for the water flowing through the space 48 between the upper reduced end 34 of the valve stem 17 and the encompassing valve seating member 25 when the valve stem is moved to a partially raised position by the spring 42, such elevation being an amount sufficient to unseat the upper sealing element or gasket 35 but not sufficient to seat the lower sealing element or gasket 38.

The valve after being assembled at its upper end upon the water supply pipe 12, is connected at its lower end to the free or unsupported end of the trough waterer or fountain 13. This connection is accomplished through the chain 15 and hooks 16 which connects the lower end of the valve stem 17 to a bracket 49 on the trough or fountain.

After the valve is attached in the manner disclosed but before the trough is connected thereto, the water supply is turned on by opening the shut-off valve 51. The sleeve 27 which forms a housing or enclosure for the valve is then turned to the left until water begins to flow through the valve and escapes or passes through the conical collar or sleeve 46. Then the sleeve 27 is slowly turned to the right until the flow of water is stopped. This latter adjustment assures automatic shut-off of the water in case the trough or fountain 13 should become disconnected or accidentally dislodged or be removed for cleaning.

Next the unsupported or free end of the trough through the bracket 49 is connected by means of the chain 15 and hooks 16 to the lower end of the valve stem 17 and by reason of the weight of the trough suspended from the valve stem, the latter is lowered an amount sufficient to unseat the lower sealing element or gasket 38 and water flows through the annular space 48 of the valve into the trough 13. Should the water in the trough reach the desired predetermined depth and continue to flow, the threaded sleeve 27 which adjusts the compression on the spring 42, is turned slowly to the left until the valve is shut off. Or, if the valve shuts off before that depth is reached, the sleeve 27 is turned slowly to the right to maintain the valve open and permit water to flow into the trough only until the predetermined depth is reached. The weight of the water in the trough, assisted by the pressure of the entering water, is employed in determining the depth of water desired in the trough and which controls the closing of the valve through the sealing element 35.

When thus properly adjusted the valve automatically shuts off when the trough is full as well as when the trough is disconnected or removed, and is adjustable through the sleeve 27 to automatically maintain any desired water level in the trough. Furthermore, the valve automatically reopens without resetting after the water has been shut off in the main supply line. By adjusting the length of the chain the trough may be adjusted to any desired height.

Having thus disclosed the invention, I claim:

1. A double-acting valve assembly for a watering trough supported in elevated position at one end and having its other end free to move vertically, comprising a valve head for connecting said valve assembly at its inlet end to a water supply and with its outlet end disposed adjacent to the freely movable end of the trough, a sleeve threadedly connected at its upper end to the head, a longitudinally movable valve stem within the sleeve, a stationary valve seating member removably mounted in the head and sleeve and provided with a bore through which the stem projects and a valve seat at each end of the bore, and a pair of sealing members fixedly mounted upon the valve stem in spaced relation whereby one or the other sealing members may be moved into sealing and seating engagement with its adjacent valve seat upon longitudinal movement of the stem, means for spring-biasing the valve stem toward elevated position and adjustable by rotation of the encompassing threaded sleeve, and means for connecting the valve stem to the free end of the trough to support the latter and whereby the weight of the trough and its contents assisted by the pressure of the entering water tends to depress the valve stem against the action of the spring and when such weight and pressure reaches a predetermined amount, one of the sealing members engages its seat and stops the flow of water through the valve, and when the weight is decreased below such predetermined amount, said last-mentioned sealing member is disengaged from its seat and water is permitted to flow from the supply to the trough until the predetermined amount is again reached when the last-mentioned sealing member again engages its seat, and when the trough is disconnected or removed from the stem, the spring-biasing means automatically elevates the stem to cause the other of said sealing members to engage its valve seat and stop the flow of water through the valve member.

2. In a valve assembly for automatically controlling the depth of water to be maintained in a trough for watering chickens and other animals, a valve head connected to the water supply, a sleeve housing the valve assembly and threadedly and adjustably connected at its upper end to the head, a double-acting valve including a valve stem connected to and supporting the trough and from which the trough depends, a stationary valve seating member removably mounted in the valve head and having a bore therethrough for receiving an end of the valve stem and a projecting valve seat encompassing the bore at each end of the seating member, a sealing element mounted on the valve stem adjacent each valve seat but so spaced as to permit limited longitudinal movement of the valve stem, and a spring carried by the lower end of the sleeve and adjustable therewith for biasing the valve stem to elevated position in which one of the sealing elements automatically engages its valve seat to stop the flow of water through the valve when the trough is removed or disconnected, the other of said sealing elements engaging its valve seat to stop the flow of water through the valve when the trough is filled to a predetermined depth of water.

3. A valve assembly for a watering trough supported in elevated position at one end and having its other end free to move vertically, comprising a valve head for connecting said valve assembly at its inlet end to a water supply and with its outlet end disposed adjacent to the freely movable end of the trough for discharging water thereat into the trough, a sleeve threadedly and adjustably connected at its upper end to the head, a stationary valve seating member removably mounted in the head and sleeve and having a bore therethrough for the passage of water and a valve seat at each end of the bore, a double-acting valve including a longitudinally movable valve stem in said sleeve and projecting through the bore of the seating member with its upper end disposed above the upper valve seat and its other end projecting downwardly through and beyond the lower end of the sleeve and thereat connected to and supporting in elevated position the free end of the trough, a sealing element carried by said valve stem above and another below said valve seats and each adapted to engage an adjacent valve seat for stopping the flow of water through the bore upon longitudinal movement of the valve stem, means within the housing for spring-biasing the valve stem to elevated position for automatically opening the valve when the weight of the trough and its contained water decreases below a predetermined amount and for automatically seating one of said sealing elements against its valve seat for closing the valve when the trough is removed or disconnected, the other of said sealing elements seating against its valve seat for closing the valve when the weight of the trough and contained water reaches said predetermined amount and closes the valve against the action of the spring, and means for adjusting the compression on the spring by rotating the sleeve and altering the threaded connection of the sleeve and head whereby to accurately control the opening and closing of the valve.

References Cited in the file of this patent

UNITED STATES PATENTS

| | | |
|---|---|---|
| 1,662,716 | Peterson | Mar. 13, 1928 |
| 1,753,122 | Kielsmeier | Apr. 1, 1930 |
| 1,835,939 | Fisher | Dec. 8, 1931 |
| 1,867,691 | Williams | July 19, 1932 |
| 2,278,655 | James | Apr. 7, 1942 |
| 2,512,839 | Pruitt | June 27, 1950 |

FOREIGN PATENTS

| | | |
|---|---|---|
| 19,987 | Australia | Nov. 1, 1934 |
| 21,891 | Australia | 1930 |